US012557729B2

(12) United States Patent
Flygare

(10) Patent No.: US 12,557,729 B2
(45) Date of Patent: Feb. 24, 2026

(54) ENERGY EFFICIENT LAWN CARE VEHICLE

(71) Applicant: HUSQVARNA AB, Huskvarna (SE)

(72) Inventor: Anders Flygare, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 841 days.

(21) Appl. No.: 17/600,279

(22) PCT Filed: Oct. 31, 2019

(86) PCT No.: PCT/IB2019/059368
§ 371 (c)(1),
(2) Date: Sep. 30, 2021

(87) PCT Pub. No.: WO2021/038287
PCT Pub. Date: Mar. 4, 2021

(65) Prior Publication Data
US 2022/0174868 A1 Jun. 9, 2022

(30) Foreign Application Priority Data

Aug. 29, 2019 (SE) .................................... 1950983-5

(51) Int. Cl.
*A01D 34/00* (2006.01)
*A01D 34/78* (2006.01)
(Continued)

(52) U.S. Cl.
CPC ........... *A01D 34/008* (2013.01); *A01D 34/78* (2013.01); *G05D 1/0217* (2013.01); *A01D 2101/00* (2013.01)

(58) Field of Classification Search
CPC .................. A01D 34/008; A01D 34/78; A01D 2101/00; G05D 1/0217; G05D 1/644; G05D 2107/23
See application file for complete search history.

(56) References Cited

U.S. PATENT DOCUMENTS

| | | |
|---|---|---|
| 5,442,901 A | 8/1995 | Niemela et al. |
| 5,444,965 A | 8/1995 | Colens |

(Continued)

FOREIGN PATENT DOCUMENTS

| | | |
|---|---|---|
| CN | 2770305 Y | 4/2006 |
| CN | 103813933 A | 5/2014 |

(Continued)

OTHER PUBLICATIONS

International Search Report and Written Opinion for International Application No. PCT/IB2019/059368 mailed on Apr. 24, 2020.
Swedish Search Report and Office Action for Application No. 1950983-5 mailed on Feb. 24, 2020.
(Continued)

*Primary Examiner* — Brian P Sweeney
(74) *Attorney, Agent, or Firm* — Burr & Forman

(57) ABSTRACT
A lawn care vehicle including a mobility assembly configured to provide mobility for the lawn care vehicle, and a working assembly configured to perform a working function on a first working path and a second working path on a parcel. The lawn care vehicle further including processing circuitry configured to execute a repositioning path to cause the lawn care vehicle to move from the first working path to the second working path and initiate an energy reduction action for the lawn care vehicle while the lawn care vehicle transits the repositioning path.

18 Claims, 9 Drawing Sheets

(51) Int. Cl.
    G05D 1/00        (2006.01)
    G05D 1/02        (2020.01)
    *A01D 101/00*    (2006.01)

(56)          References Cited

U.S. PATENT DOCUMENTS

| | | | |
|---|---|---|---|
| 5,937,622 | A | 8/1999 | Carrier et al. |
| 6,886,317 | B2 | 5/2005 | Jackson et al. |
| 8,966,870 | B2 | 3/2015 | Mackinnon et al. |
| 9,615,508 | B2 | 4/2017 | Ito et al. |
| 2014/0182257 | A1 | 7/2014 | Von Rentzell |
| 2016/0174459 | A1* | 6/2016 | Balutis ................. A01D 34/008 |
| | | | 701/25 |
| 2016/0366818 | A1 | 12/2016 | Ouyang |

FOREIGN PATENT DOCUMENTS

| | | | |
|---|---|---|---|
| CN | 104219946 | A | 12/2014 |
| CN | 107291071 | A | 10/2017 |
| CN | 206686643 | U | 12/2017 |
| CN | 108064539 | A | 5/2018 |
| CN | 109348831 | A | 2/2019 |
| CN | 109661700 | A | 4/2019 |
| GB | 2307062 | A | 5/1997 |
| JP | 2013-188161 | A | 9/2013 |
| KR | 20100118454 | A | 11/2010 |
| WO | 2011032307 | A1 | 3/2011 |
| WO | 2019096264 | A1 | 5/2019 |

* cited by examiner

48

WIRELESS
COMMUNICATION
NETWORK 42     44

46

40

12

10

30

20

Perform a working function on a first working path — 700

Execute a repositioning path to move from the first working path to a second working path — 700

Initiate an energy reduction action while transiting the repositioning path — 720

Perform a working function on the second working path — 730

ENERGY EFFICIENT LAWN CARE VEHICLE

CROSS REFERENCE TO RELATED APPLICATION

This application claims priority to Swedish application number 1950983-5 filed Aug. 29, 2019, the entire contents of which are hereby incorporated by reference in its entirety.

TECHNICAL FIELD

Example embodiments generally relate to a lawn care vehicle and, more particularly, relate to a lawn care vehicle that is configured to implement energy reducing actions while working a parcel.

BACKGROUND

Yard maintenance tasks are commonly performed using various tools or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic vehicles or remote controlled mowers have also become options for consumers to consider.

Lawn care vehicles, such as robotic vehicles, are typically capable of transiting over even and uneven terrain to execute yard maintenance activities relating to mowing. They may be programmed to stay within a defined area while performing their mowing tasks, and may even be configured to perform other tasks in the defined area. Thus, it may be desirable to expand the capabilities of robotic vehicles to improve their utility and functionality.

BRIEF SUMMARY OF SOME EXAMPLES

Some example embodiments may therefore provide a lawn care vehicle, such as a robotic vehicle, that can employ various sensors and modules, for example, for use in connection with mapping and tracking movement over a parcel being worked. Based on the map generated and the movement tracked, the lawn care vehicle may be configured to reduce energy being expended while traversing the parcel, as appropriate, in order to ensure maximum energy efficiency of the lawn care vehicle.

In accordance with some example embodiments, a lawn care vehicle is provided. The lawn care vehicle may include a mobility assembly configured to provide mobility for the lawn care vehicle, and a working assembly configured to perform a working function on a first working path and a second working path on a parcel. The lawn care vehicle may further include processing circuitry configured to execute a repositioning path to cause the lawn care vehicle to move from the first working path to the second working path and initiate an energy reduction action for the lawn care vehicle while the lawn care vehicle transits the repositioning path.

In another example embodiment, a method is provided. The method may include causing, via processing circuitry of a lawn care vehicle, the lawn care vehicle to perform a working function on a first working path and detecting a repositioning path, via the processing circuitry, to cause the lawn care vehicle to move from the first working path to a second working path. The method may also include initiating, via the processing circuitry, an energy reduction action while the lawn care vehicle transits the repositioning path, and causing, via the processing circuitry, the lawn care vehicle to perform a working function on the second working path.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
FIG. 1 illustrates an example operating environment for a robotic vehicle that may employ an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "garden" is meant to relate to any yard, parcel, grounds, or other property that is maintained or monitored using equipment. As such, the term garden could refer to an area in which various varieties of vegetation could be cultivated including, for example, grasses, trees, bushes, shrubs, flowers, vegetables, fruits, herbs, or the like. As used herein, operable coupling should be understood to relate to direct or indirect connection that, in either case, enables functional interconnection of components that are operably coupled to each other.

As noted above, a lawn care vehicle, such as a robotic vehicle or a riding or walk-behind mower, may be configured to map and track movement as the lawn care vehicle traverses and works the parcel. The map generated and the movement tracked may be useful in enabling the lawn care vehicle to reduce energy, where appropriate, when traversing the parcel in order to maximize battery life of the lawn care vehicle. Accordingly, the lawn care vehicle may be configured to reduce the energy being expended while traversing and working the parcel in order to ensure maximum energy efficiency by the lawn care vehicle.

FIG. 1 illustrates an example operating environment for a robotic vehicle (e.g., mower) 10 according to an example embodiment. However, it should be appreciated that example embodiments may be employed on numerous other vehicles (e.g., lawn care vehicles such as riding or walk-behind lawn care vehicles), so the robotic vehicle 10 should be recognized as merely one example of such a vehicle. The robotic vehicle 10 may operate to cut grass on a parcel 20 (i.e., a land lot, yard, or garden), the boundary 30 of which may be defined using one or more physical boundaries (e.g., a fence, wall, curb, or the like), a boundary wire, programmed location based boundaries, or combinations thereof. When the boundary 30 is detected, by any suitable means, the robotic vehicle 10 may be informed so that the robotic vehicle 10 may operate in a manner that prevents the robotic vehicle 10 from leaving or moving outside the boundary 30. In some cases, the boundary 30 may be provided by a wire that is detectable by the robotic vehicle 10. However, in other example embodiments, the robotic vehicle 10 may also or alternatively be configured to detect boundaries without a wire using accurate position information determinable from one or more positioning sources on the robotic vehicle 10.

The robotic vehicle 10 may be controlled, at least in part, via control circuitry 12 located onboard. The control circuitry 12 may include, among other things, a positioning module 60, a mapping module 70, an energy management module 80, and a sensor network 90 (see FIG. 2), which will be described in greater detail below. Of note, example embodiments that use a boundary wire to mark the boundary 30 may not require or utilize the positioning module 60 and/or the mapping module 70, but may instead use simpler circuitry that directs movement of the robotic vehicle 10 within the boundaries of the boundary wire. Such example embodiments may still, however, employ the energy management module 80 described herein, and the sensor network 90. The sensor network 90 could include sensors for detecting the boundary wire. In any case, the robotic vehicle 10 may utilize the control circuitry 12 to define a path for coverage of the parcel 20 in terms of performing a task (or a working operation) over specified portions or the entire parcel 20 while ensuring energy efficiency of the robotic vehicle 10. In this regard, the positioning module 60 and mapping module 70 (if employed) may be used to guide the robotic vehicle 10 over the parcel 20 and to ensure that full coverage (of at least predetermined portions of the parcel 20) is obtained while the energy management module 80 ensures the energy expended by the robotic vehicle 10 is done efficiently. Furthermore, the sensor network 90 may detect objects or gather data regarding the surroundings of the robotic vehicle 10 while the parcel 20 is traversed.

If a sensor network 90 is employed, the sensor network 90 may include sensors related to positional determination (e.g., a GPS receiver, an accelerometer, a camera, a radar transmitter/detector, an ultrasonic sensor, a laser scanner and/or the like). Thus, for example, positional determinations may be made using GPS, inertial navigation, optical flow, radio navigation, visual location (e.g., VSLAM) or other positioning techniques or combinations thereof. Accordingly, the sensors may be used, at least in part, for determining the location of the robotic vehicle 10 relative to boundaries or other points of interest (e.g., a starting point or other key features) of the parcel 20, or determining a position history or track of the robotic vehicle 10 over time. The sensors may also detect objects, collision, tipping over, or various fault conditions. In some cases, the sensors may also or alternatively collect data regarding various measurable parameters (e.g., surface type, moisture, temperature, soil conditions, etc.) associated with particular locations on the parcel 20.

In an example embodiment, the robotic vehicle 10 may be battery powered via one or more rechargeable batteries. Accordingly, the robotic vehicle 10 may be configured to return to a charge station 40 that may be located at some position on the parcel 20 in order to recharge the batteries. The batteries may power a drive system and a blade control system of the robotic vehicle 10. However, the control circuitry 12 of the robotic vehicle 10 may selectively control the application of power or other control signals to the drive system and/or the blade control system to direct the operation of the drive system and/or blade control system. Accordingly, movement of the robotic vehicle 10 over the parcel 20 may be controlled by the control circuitry 12 in a manner that enables the robotic vehicle 10 to systematically traverse the parcel to cut the grass on the parcel 20 while controlling speed and operation of a cutting blade or robotic vehicle 10, for example, to ensure optimal energy efficiency of the robotic vehicle 10. In cases where the robotic vehicle 10 is not a mower, the control circuitry 12 may be configured to control another functional or working assembly that may replace the blade control system and cutting blades to perform working operations such as vacuuming, plowing, snow blowing, watering, etc.

In some embodiments, the control circuitry 12 or a communication node at the charge station 40 may be configured to communicate wirelessly with an electronic device 42 (e.g., a personal computer, a cloud based computer, server, mobile telephone, PDA, tablet, smart phone, and/or the like) of a remote operator 44 (or user) via wireless links 46 associated with a wireless communication network 48. The wireless communication network 48 may provide operable coupling between the remote operator 44 and the robotic vehicle 10 via the electronic device 42, which may act as a remote control device for the robotic vehicle 10 or may receive data indicative or related to the operation of the robotic vehicle 10. However, it should be appreciated that the wireless communication network 48 may include additional or internal components that facilitate the communication links and protocols employed. Thus, some portions of the wireless communication network 48 may employ additional components and connections that may be wired and/or wireless. For example, the charge station 40 may have a wired connection to a computer or server that is connected to the wireless communication network 48, which may then wirelessly connect to the electronic device 42. As another example, the robotic vehicle 10 may wirelessly connect to the wireless communication network 48 (directly or indirectly) and a wired connection may be established between one or more servers of the wireless communication network 48 and a PC of the remote operator 44. In some embodiments, the wireless communication network 48 may be a data network, such as a local area network (LAN), a metropolitan area network (MAN), a wide area network (WAN)

(e.g., the Internet), and/or the like, which may couple the robotic vehicle 10 to devices such as processing elements (e.g., personal computers, server computers or the like) or databases. Accordingly, communication between the wireless communication network 48 and the devices or databases (e.g., servers, electronic device 42, control circuitry 12) may be accomplished by either wireline or wireless communication mechanisms and corresponding protocols. However, some embodiments may operate absent remote operation or the wireless communication network 48 entirely.

Figure 2:
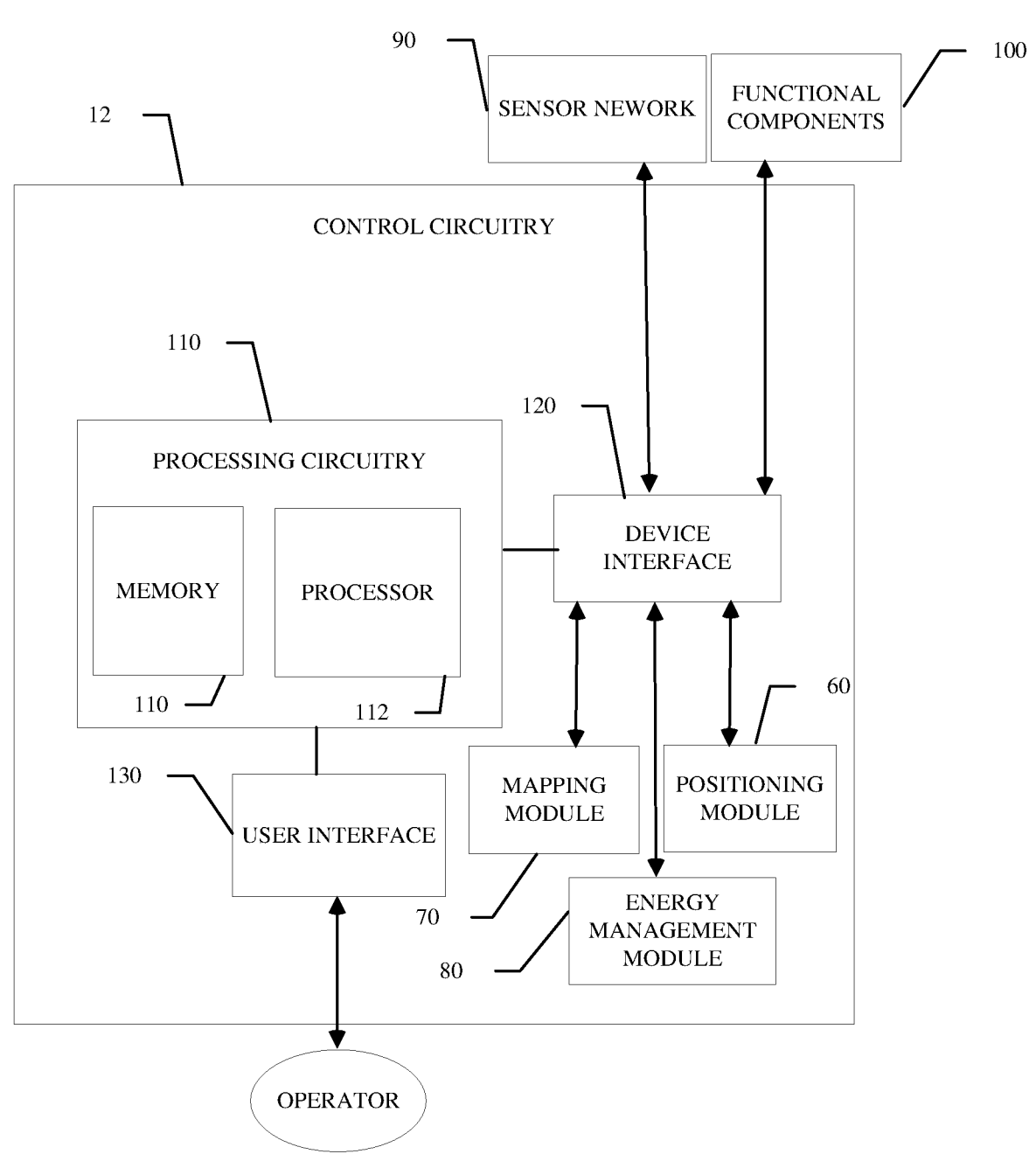
FIG. 2 illustrates a block diagram of various components of processing circuitry of a robotic vehicle to illustrate some of the components that enable the functional performance of the robotic vehicle and to facilitate description of an example embodiment.

FIG. 2 illustrates a block diagram of various components of the control circuitry 12 to illustrate some of the components that may enable or enhance the functional performance of the robotic vehicle 10 and to facilitate description of an example embodiment. In some example embodiments, the control circuitry 12 may include or otherwise be in communication with the positioning module 60, the mapping module 70, and the energy management module 80. The positioning module 60 and the mapping module 70 may work together to give the robotic vehicle 10 a comprehensive understanding of its environment, and enable the robotic vehicle 10 to operate autonomously within bounded areas of variable size or character including some cases in which no boundary wires are employed. The energy management module 80 may be configured to direct the robotic vehicle 10 in a manner that ensures energy expended by the robotic vehicle 10 is done efficiently in order to maximize the charge of the battery of the robotic vehicle 10.

In some cases, the positioning module 60 may be part of the sensor network 90 of the robotic vehicle 10. However, in some cases, the positioning module 60 may be separate from but otherwise in communication with the sensor network 90 to facilitate operation of the positioning module 60. The mapping module 70 and the energy management module 80 may each be an entity embodied as configured hardware, where the configuration is as described herein and/or performs functions as described herein.

The robotic vehicle 10 may also include one or more functional components 100 that may be controlled by the control circuitry 12 or otherwise be operated in connection with the operation of the robotic vehicle 10. The functional components 100 may include a wheel assembly (or other mobility assembly components), one or more cutting blades and corresponding blade control components, and/or other such devices. In embodiments where the robotic vehicle is not a mower, the functional components 100 may include equipment for performing various lawn care functions such as, for example, taking soil samples, operating valves, distributing water, seed, powder, pellets or chemicals, and/or other functional devices and/or components.

The control circuitry 12 may include processing circuitry 110 that may be configured to perform data processing or control function execution and/or other processing and management services according to an example embodiment. In some embodiments, the processing circuitry 110 may be embodied as a chip or chip set. In other words, the processing circuitry 110 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 110 may therefore, in some cases, be configured to implement an embodiment on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g., an integrated circuit chip) configured (e.g., with hardware, software or a combination of hardware and software) to perform operations described herein. However, in some embodiments, the processing circuitry 110 may be embodied as a portion of an on-board computer. In some embodiments, the processing circuitry 110 may communicate with electronic components and/or sensors of the robotic vehicle 10 via a single data bus. As such, the data bus may connect to a plurality or all of the switching components, sensory components and/or other electrically controlled components of the robotic vehicle 10.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the positioning module 60, the mapping module 70, and the energy management module 80. As such, in some embodiments, the processor 112 (or the processing circuitry 110) may be said to cause each of the operations described in connection with the positioning module 60, the mapping module 70, and the energy management module 80 by directing the positioning module 60, the mapping module 70, and the energy management module 80, respectively, to undertake the corresponding functionalities responsive to execution of instructions or algorithms configuring the processor 112 (or processing circuitry 110) accordingly. These instructions or algorithms may configure the processing circuitry 110, and thereby also the robotic vehicle 10, into a tool for driving the corresponding physical components for performing corresponding functions in the physical world in accordance with the instructions provided.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the vehicle positioning module 60, the boundary management module 70, and the energy management module 80 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative, the memory 114 may include one or more databases that may store a variety of data sets responsive to input from various sensors or components of the robotic vehicle 10. Among the contents of the memory 114, applications may be stored for execution by the processor 112 in order to carry out the functionality associated with each respective application.

The applications may include applications for controlling the robotic vehicle 10 relative to various operations including determining an accurate position of the robotic vehicle 10 (e.g., using one or more sensors of the positioning module 60). Alternatively or additionally, the applications may include applications for controlling the robotic vehicle 10 relative to various operations including determining the existence and/or position of obstacles (e.g., static or dynamic) and borders relative to which the robotic vehicle 10 must navigate. Alternatively or additionally, the applications may include applications for controlling the robotic vehicle 10 relative to various operations including mapping a parcel or operating the robotic vehicle 10 relative to a map (generated or provided) (e.g., using one or more sensors of the mapping module 70). Alternatively or additionally, the applications may include applications for controlling the robotic vehicle 10 and it components relative to the detected position, obstacles, and borders relative to which the robotic vehicle 10 must navigate. Alternatively or additionally, the applications may include applications for controlling the robotic vehicle 10 relative to various operations that reduce energy expended by the robotic vehicle while traversing the parcel 20 (e.g., using the energy management module 80). The applications and/or algorithms may therefore include instructions for performing the functionality described herein when executed.

The user interface 130 (if implemented) may be in communication with the processing circuitry 110 to receive an indication of a user input at the user interface 130 and/or to provide an audible, visual, mechanical or other output to the user. As such, the user interface 130 may include, for example, a display, one or more buttons or keys (e.g., function buttons), and/or other input/output mechanisms (e.g., microphone, speakers, cursor, joystick, lights and/or the like).

The device interface 120 may include one or more interface mechanisms for enabling communication with other devices either locally or remotely. In some cases, the device interface 120 may be any means such as a device or circuitry embodied in either hardware, or a combination of hardware and software that is configured to receive and/or transmit data from/to sensors or other components in communication with the processing circuitry 110. In some example embodiments, the device interface 120 may provide interfaces for communication of data to/from the control circuitry 12, the positioning module 60, the mapping module 70, the energy management module 80, the sensor network 90, and/or other functional components 100 via wired or wireless communication interfaces in a real-time manner, as a data package downloaded after data gathering or in one or more burst transmission of any kind.

Each of the positioning module 60, the mapping module 70, and the energy management module 80 may be any means such as a device or circuitry embodied in either hardware, or a combination of hardware and software that is configured to perform the corresponding functions described herein. Thus, the modules may include hardware and/or instructions for execution on hardware (e.g., embedded processing circuitry) that is part of the control circuitry 12 of the robotic vehicle 10. The modules may share some parts of the hardware and/or instructions that form each module, or they may be distinctly formed. As such, the modules and components thereof are not necessarily intended to be mutually exclusive relative to each other from a compositional perspective.

The positioning module 60 may be configured to utilize one or more sensors (e.g., of the sensor network 90) to determine a location of the robotic vehicle 10 and direct continued motion of the robotic vehicle 10 to achieve appropriate coverage of the parcel 20. As such, the robotic vehicle 10 (or more specifically, the control circuitry 12) may use the location information to determine a mower track and/or provide full coverage of the parcel 20 to ensure the entire parcel is mowed (or otherwise serviced). The positioning module 60 may therefore be configured to direct movement of the robotic vehicle 10, including the speed and direction of the robotic vehicle 10. The positioning module 60 may also employ such sensors to attempt to determine an accurate current location of the robotic vehicle 10 on the parcel 20 (or generally).

Various sensors of sensor network 90 of the robotic vehicle 10 may be included as a portion of, or otherwise communicate with, the positioning module 60 to, for example, determine vehicle speed/direction, vehicle location, vehicle orientation and/or the like. Sensors may also be used to determine motor run time, machine work time, and other operational parameters. In some embodiments, positioning and/or orientation sensors (e.g., global positioning system (GPS) receiver and/or accelerometer) may be included to monitor, display and/or record data regarding vehicle position and/or orientation as part of the positioning module 60.

In some cases, the mapping module 70 may be configured to track or manage boundaries and operations relative to such boundaries. In an example embodiment, the mapping module 70 may store or have access to a plurality of different sets of boundaries. The sets of boundaries may each correspond to sets of stored positions or coordinate locations that form the boundaries. In some cases, the stored positions or coordinate locations may form a continuous or substantially continuous boundary within which the robotic vehicle 10 is operable. Thus, when the robotic vehicle 10 reaches or nears the boundary while monitoring its own position, the robotic vehicle 10 may turn to stay within the boundary. Other methods of boundary designation (with or without wires) may also be employed. For example, the boundaries may be traced on a map and the robotic vehicle 10 may plot its location on the map and operate to stay within the boundaries traced on the map. Still other methods are also possible.

In an example embodiment, the mapping module 70 may be configured to utilize one or more sensors (e.g., of the sensor network 90) to generate a map of the parcel 20, or to facilitate operation of the robotic vehicle 10 relative to an existing (or previously generated) map of the parcel 20. Thus, the mapping module 70 may include components that enable a map to be generated from sensor data gathered by the robotic vehicle 10 responsive to movement of the robotic vehicle 10 about the parcel 20. Alternatively or additionally, the mapping module 70 may enable the robotic vehicle 10 to understand or orient itself relative to an existing map. Thus, for example, the mapping module 70 may enable data gathered to be used to generate a map or may enable such data to be correlated to map data to allow the robotic vehicle 10 to reconcile its position with a map. Various sensors of sensor network 90 of the robotic vehicle 10 may be included as a portion of, or otherwise communicate with, the mapping module 70 to, for example, build a graphical display of the parcel 20 and the various objects, boundaries, zones or other differentiating features of the parcel 20 so that the graphical display can be used for future operation or current operation of the robotic vehicle 10, or to facilitate the consumption of data that may be correlated to various map locations.

Accordingly, the sensor network 90 may provide data to the modules described above to facilitate execution of the functions described above, and/or any other functions that the modules may be configurable to perform. Therefore, the robotic vehicle 10 may therefore be capable of accurately determining position and gathering information about surroundings. With accurate position determining capabilities, and the ability to experience surroundings with multiple sensors, the control circuitry 12 may be configured to perform and initiate energy reduction actions for the robotic vehicle 10, via the energy management module 80, in order to maximize the energy efficiency and savings of the robotic vehicle 10. The robotic vehicle 10 may therefore be more capable of being programmed to perform autonomous energy reduction activities of various kinds, and the value proposition for owners and operators may be greatly enhanced.

Figure 3:
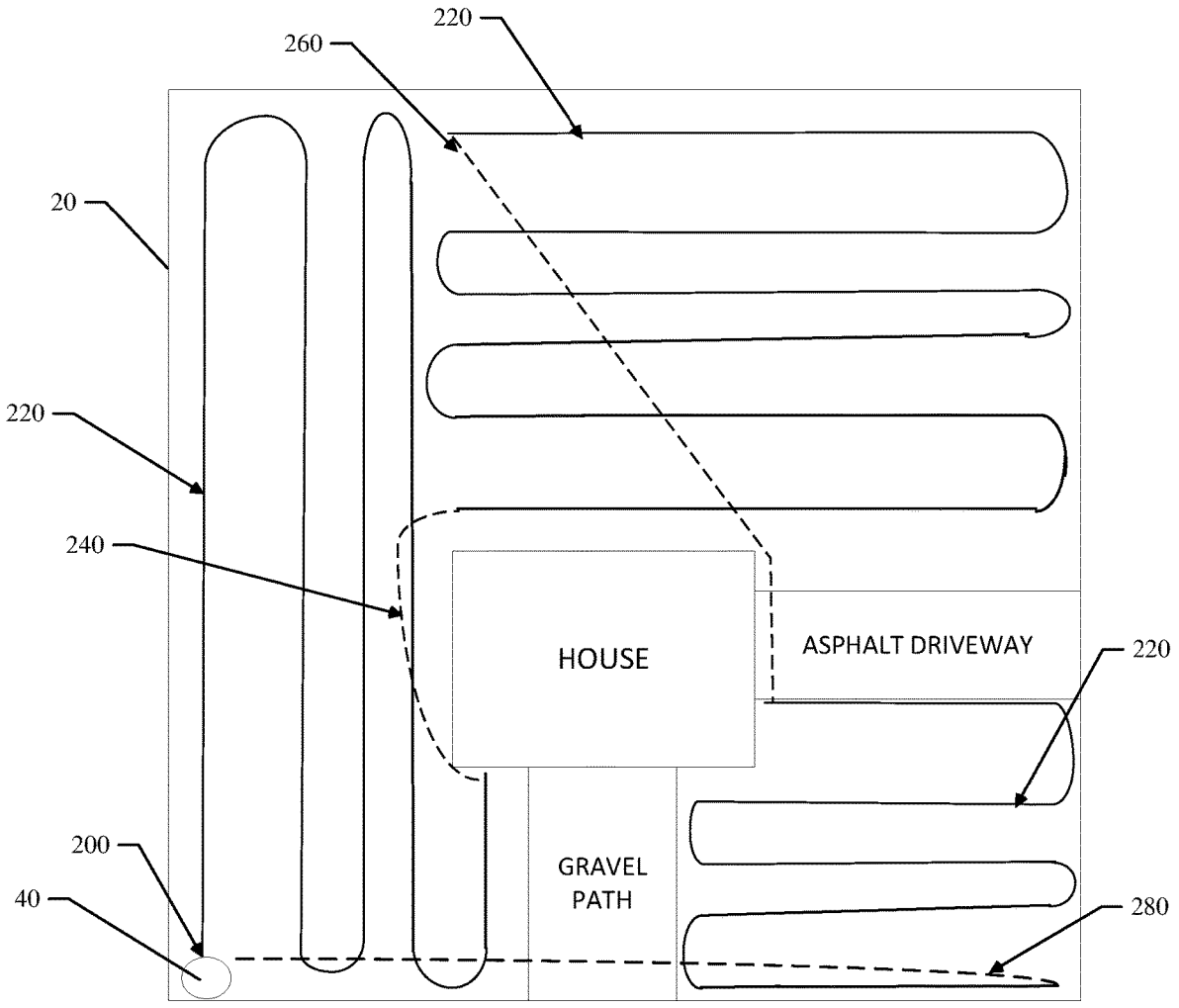
FIG. 3 illustrates a map view of a parcel being worked by a robotic vehicle in accordance with an example embodiment.

FIG. 3 illustrates a diagram of the robotic vehicle 10 working the parcel 20. Based on information received from the positioning module 60 and the mapping module 70, the robotic vehicle 10 may begin mowing the parcel 20, which is a grass surface unless other noted, at point 200 and continue along path 220. The path 220 may be a stored path or calculated based on a charge of the battery of the robotic vehicle 10. Furthermore, while traversing the path 220, the mapping module 70 may be configured to detect and classify the surface the robotic vehicle 10 traverses. For example, the mapping module 70 may be configured to detect and/or record if the surface is grass, asphalt, rock, gravel, or the like. In this respect, as shown in FIG. 3, as the robotic vehicle traverses the path 220, the mapping module 70 may record the movement history of the robotic vehicle 10 in combination with whether the surface has been worked (e.g., mowed), time, surface type, or the like. It should be understood that the mapping module 70 may already be oriented with the types of surfaces the robotic vehicle 10 will encounter when traversing the parcel 20 based on a stored map inputted via the user or the like, and the mapping module 70 may be configured to confirm the surface type as the robotic vehicle 10 traverses the parcel 20.

As the robotic vehicle 10 traverses the path 220 in order to work the parcel 20 (e.g., cut grass), the robotic vehicle 10 may encounter surfaces already worked or surfaces that do not need or cannot be worked (e.g., asphalt or rock that cannot be mowed). When the robotic vehicle 10 encounters a surface that does not need to be or cannot be worked, the energy management module 80 may be configured to initiate an energy reduction action until the robotic vehicle 10 again reaches an area that needs to be worked or until the robotic vehicle 10 is docked in the charging station 40 for recharging. As noted above, path 220 in FIG. 3 indicates an area that has already been or will be worked by the robotic vehicle 10. However, in order to continue along path 200 to complete the mowing operation on the parcel 20, the robotic vehicle 10 must move along path 240, which doubles back over an area that has already been worked.

When the robotic vehicle 10 reaches path 240, the energy management module 80 may detect that a surface already worked has been encountered and implement an energy reduction action. The energy reduction actions in accordance with example embodiments herein may include, for example, changing the blade speed (e.g., slowing or stopping rotation of the blade of the robotic vehicle 10), changing the speed of the robotic vehicle 10 (e.g., reducing the speed of the robotic vehicle 10), or a combination thereof. The type of energy reduction action implemented may be based on the conditions encountered by the robotic vehicle 10. For example, the energy reduction action implemented by the energy management module 80 may be based on surface type or distance or time spent in an already worked or unworkable area. In this respect, if the robotic vehicle 10 encounters a surface such as asphalt or gravel, the energy management module 80 may be configured to stop or reduce rotation of the blade of the robotic vehicle 10. If the surface encountered is grass, the energy management module 80 may be configured to stop or reduce rotation of the blade of the robotic vehicle 10. Furthermore, if the energy reduction action is going to be implemented for distance longer than a predetermined threshold, the speed of the robotic vehicle 10 may be slowed or otherwise changed to an energy efficient speed. If the distance is shorter than the predetermined threshold, the speed of the blade may be slowed additionally and/or instead.

In this regard, path 240 in FIG. 3 requires the robotic vehicle 10 to travel over a grass surface that has already been worked by the robotic vehicle 10 for a distance less than the energy reduction distance threshold (the distance threshold either being programmed by the user or a default setting, e.g., 10 meters). Accordingly, because conditions encountered indicate the surface is grass and the distance does not exceed the energy reduction distance threshold, the energy management module 80 may initiate an energy reduction action that reduces the blade speed of the robotic vehicle 10 while the robotic vehicle 10 traverses path 240. It should be understood, however, that if information received from the positioning module 60 and the mapping module 70 indicated that path 240 was a greater distance than the energy reduction distance threshold, the energy management module 80 may have instead reduced the speed of the robotic vehicle 10 (or otherwise selected an energy efficient speed) in order to optimize or maximize the reduction of energy expended by the robotic vehicle 10. Furthermore, once the robotic vehicle 10 is again on path 220, the energy reduction action may be ended by the energy management module 80 and normal operation of the robotic vehicle 10 may be continued such that otherwise normal blades speeds and/or movement speeds may be resumed.

As further shown in FIG. 3, the robotic vehicle 10 may encounter a situation while working the parcel 20 that will also require the robotic vehicle 10 to take path 260 in order to continue along path 220 and continue the mowing operation on the parcel 20. Path 260 may require the robotic vehicle 10 to travel over a combination of grass and asphalt surfaces for a distance longer than the energy reduction distance threshold. Because the conditions encountered by the robotic vehicle 10 indicate an asphalt surface will be encountered (either through detecting the asphalt, or through knowledge due to a stored map or other memory-based methods) and the energy reduction action will need to be implemented for a distance longer the energy reduction distance threshold, the energy management module 80 may be configured to implement a plurality of energy reduction actions to optimize the energy efficiency of the robotic vehicle 10 including reducing the speed of the robotic vehicle 10 in order to account for the distance of path 260 and stopping rotation of the blade to account for the surfaces encountered.

Furthermore, when the robotic vehicle 10 has finished working the parcel 20 and must take path 280 in order to return back to the charging station 40 for recharging the battery, the energy management module 80 may also initiate an energy reduction action as the robotic vehicle 10 will encounter conditions such as an unworkable surfaces (i.e., gravel) and surfaces already worked. In this respect, as the robotic vehicle 10 has finished working the parcel 20, the energy management module 80 may stop rotation of the blade and/or reduce speed of the robotic vehicle 10 (maximizing the energy reduction of the robotic vehicle 10) as no further work needs to be done on the parcel 20, while returning to the charging station 40. Accordingly, the energy management module 80 may implement one or more of various energy reduction actions while the robotic vehicle 10 is working the parcel 20 in order to reduce energy expended by the robotic vehicle 10. In this regard, the energy reduction action implemented by the robotic vehicle 10 may be chosen based on conditions encountered and which action will maximum energy efficiency of the robotic vehicle 10.

In some examples, the energy reduction action implemented by the energy management module 80 may take in account a time criterion. In this regard, the energy management module 80 may be configured to determine if a surface already worked or an unworkable surface is being encountered within a same charge of the battery of the robotic vehicle 10, a same cutting event, a same day, a given time period (e.g., 3 hours), or for a same continuous movement period. For example, when the energy management module 80 determines that a surface already worked or an workable surface is encountered, the energy management module 80 may determine what movement history and timing is applicable to the determination (e.g., movement history indicates the surface was already worked, but that the prior working occurred 5 days ago). If the time criterion has passed (movement history of the robotic vehicle 10 is from a different battery charge, a different day, or over a predetermined time period or like), the energy management module 80 may be configured to ignore or delete the movement history and not initiate the energy reduction action in order to prevent the robotic vehicle 10 from initiating an energy reduction action inappropriately. It should be understood that surface type data (e.g., the surface being asphalt, grass, gravel or the like) may not be deleted but stored in order to assist the energy management module 80 in implementing future energy reduction actions.

Figure 4:
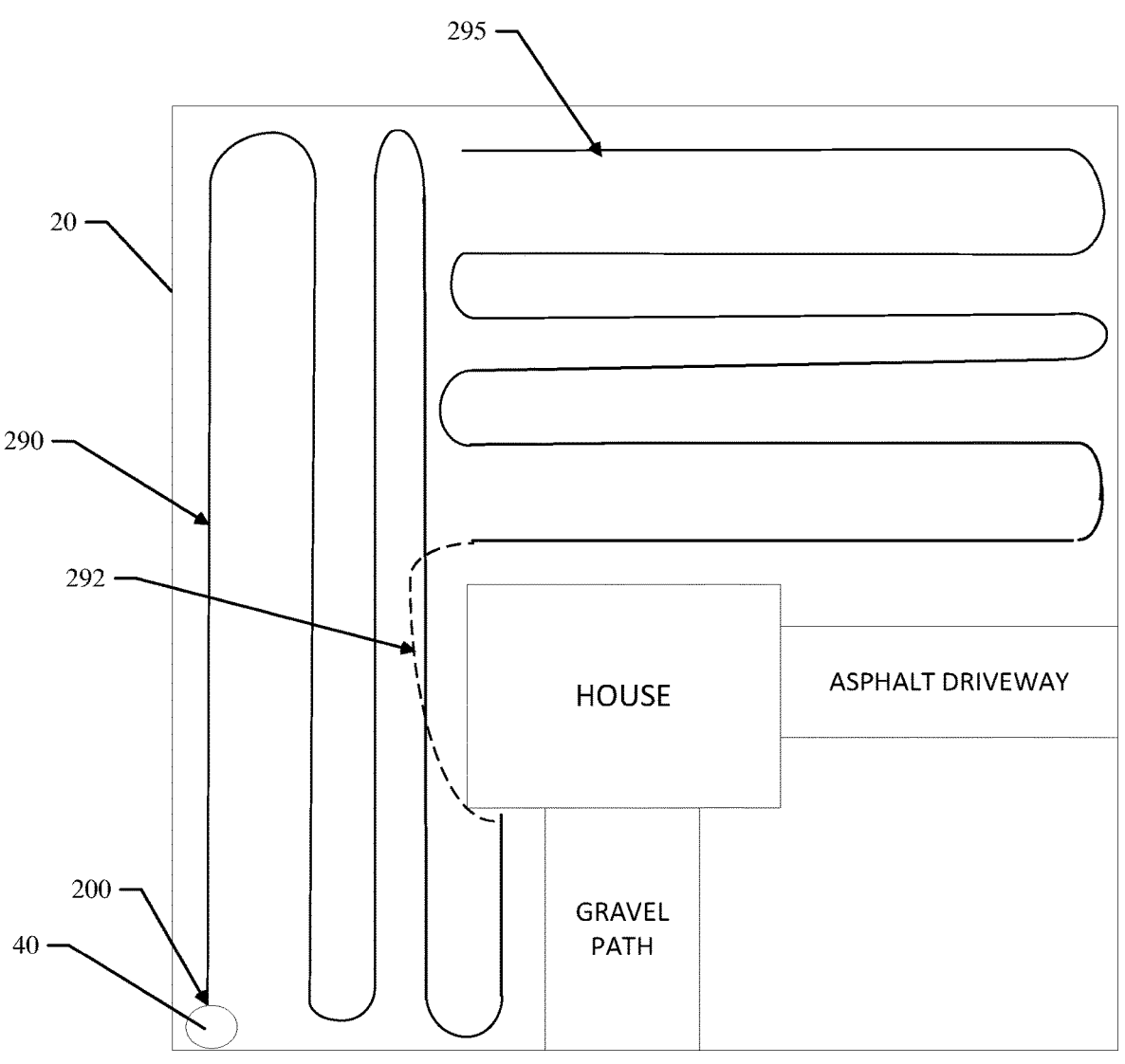
FIG. 4 illustrates a map view of a parcel being worked by a robotic vehicle in accordance with a further example embodiment

FIG. 3 above refers to a robotic vehicle 10 moving along a predetermined path already planned by the control circuitry 12. However, in accordance with some example embodiments, the robotic vehicle 10 may not necessarily follow a pre-programmed or stored path to work the parcel 20. Rather, the robotic vehicle 10 may not necessarily have a set path to traverse the parcel 20. FIG. 4 illustrates a diagram of the robotic vehicle 10 working the parcel 20 not necessarily in accordance with a stored path for traversing the entire parcel 20.

Similar to FIG. 3, the robotic vehicle 10 in FIG. 4 may begin mowing the parcel 20, which is a grass surface unless other noted, at point 200 and continue along a first working path 290. The first working path 290 may be a stored path or the path may be based on conditions detected by the robotic vehicle 10. Furthermore, the robotic vehicle 10 traverses the first working path 290 to mow a first section of the parcel 20. When the robotic vehicle 10 has completed the working operation of the first section, the robotic vehicle 10 may also be instructed to mow a second section of the parcel 20.

In order to mow the second section, the robotic vehicle 10 must travel from the first working path 290 to the second working path 295. Again, the second working path 295 may be a stored path or based on conditions detected by the robotic vehicle 10. However, as shown in FIG. 4, the first working path 290 and the second working path 295 are discontinuous paths. In order to move from the first working path 290 and the second working path 295, the robotic vehicle 10 may begin transiting the parcel 20 via repositioning path 292, which again is either a stored path or based on the conditions encountered by the robotic vehicle 10.

Repositioning path 292, however, is through a surface already worked by the robotic vehicle 10. Similar to the operations discussed in relation to FIG. 3, the energy management module 80 may be configured to initiate an energy reduction action while the robotic vehicle 10 transits the repositioning path 292. Accordingly, when the robotic vehicle 10 leaves the first working path 290 and until the robotic vehicle 10 reaches the second working path 295, the energy management module 80 may initiate an energy reduction action as discussed herein.

The above-example embodiments relate to the robotic vehicle 10 traversing and working the parcel 20. However, it should be understood that other lawn care vehicles such as riding or walk-behind lawn care vehicles may perform example embodiments described herein. For example, in the case of a riding lawn care vehicle, an operator of the riding lawn care vehicle may navigate the riding lawn care vehicle along a path as desired. An energy management module 80, similar to as described above, may initiate an energy reduction action, as appropriate, as the riding lawn care vehicle traverses the path dictated by the operator of the riding lawn care vehicle.

In one example embodiment, the energy management systems and methods described herein may be incorporated into and practiced by a walk-behind lawn care vehicle. In such an embodiment, a user may direct a self-propelled walk-behind lawn care vehicle (or push a walk-behind lawn care vehicle that is not self-propelled) along a first working path (e.g., first working path 290) to work the surface in a first area of parcel 20. The user may then manually reposition (e.g., push or direct) the vehicle to a second area of parcel 20 and work the surface in that area along a second working path (e.g., second working path 295). As discussed above and shown in FIG. 4, the user may push or direct the vehicle along a path (e.g., repositioning path 292) over a portion of the first area of the parcel 20 that has already been worked (i.e., along first working path 290) or along an area that is unworkable (e.g., a gravel path) in order to reposition the vehicle to the second working area or path. The vehicle (e.g., energy management module 80) may detect that an area has already been worked (or that the area is unworkable) and initiate an energy reduction action, as discussed herein. More specifically, the energy management module 80 may slow or stop the rotation of the mower blades or alter the speed according to which the vehicle is propelled. In the event the walk-behind lawn care vehicle is not self-propelled (i.e., a push mower), the energy reduction action may be limited to affecting the speed of the blades (i.e., not the speed of travel of the vehicle).

In another example embodiment, the energy management systems and methods described herein may be incorporated into and practiced by a ride-on lawn care vehicle. In such an embodiment, a user may direct a ride-on lawn care vehicle along a first working path (e.g., first working path 290) to work the surface in a first area of parcel 20. The user may then manually reposition (e.g., via a steering wheel or steering levers) the vehicle to a second area of parcel 20 and work the surface in that area along a second working path (e.g., second working path 295). If the vehicle (e.g., energy management module 80) detects that repositioning the vehicle from the first area to the second area causes the vehicle to pass over an area that is unworkable or already worked, energy management module 80 may initiate an energy reduction action, as discussed herein (e.g., stop or reduce blade rotation speed, speed up or slow down propulsion speed of vehicle). Moreover, in non-autonomous walk-behind or ride-on lawn care vehicles, it may be useful to alert the user that the vehicle is traversing an area that has previously been worked or is unworkable. Thus, the energy management module 80 may cause an alert to be displayed on a display screen of a ride-on or walk-behind lawn care vehicle, such that the user of the vehicle may take appropriate action (e.g., adjust blade rotation speed or vehicle propulsion speed). Other alert methods or systems are possible, such as an audible alert, vibration (e.g., on a steering handle, wheel, or lever), or flashing light (e.g., an LED light placed on a steering handle, wheel, or lever, or on a dashboard), as would be understood by one of ordinary skill in the art.

Figure 5:
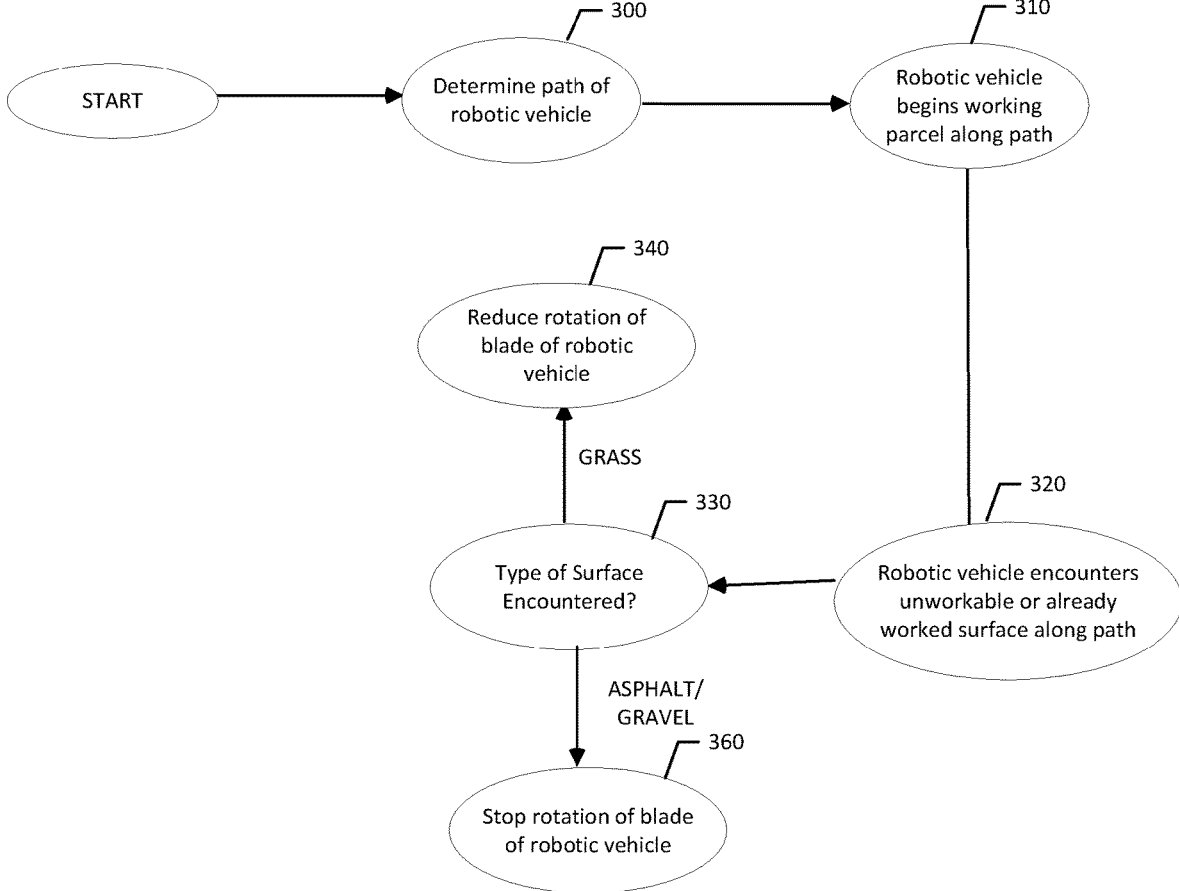
FIG. 5 illustrates a control flow diagram showing an energy reduction action that may be executed in accordance with an example embodiment.

FIG. 5 illustrates a control flow diagram of one example of how the robotic vehicle 10 may be operated in relation to implementing an energy reduction action in accordance with an example embodiment. As shown in FIG. 5, operation 300 may begin with the positioning module 60 and/or the mapping module 70 contributing to determining the path by which the robotic vehicle 10 is to work a parcel 20. At operation 310, the robotic vehicle 10 may begin working the parcel 20 along the determined path. While working parcel along the determined path, the robotic vehicle 10 may encounter an unworkable or already worked surface at operation 320. At operation 330, the energy management module 80 may classify the unworkable or already worked surface as a grass, asphalt, or gravel/rock surface. Of note, this surface type determination operation is entirely optional, and may not be performed in some cases. If the surface type determination operation is made and the surface is grass, the energy management module 80 may implement an energy reduction action of reducing rotation of a blade of the robotic vehicle 10 at operation 340. If the surface is asphalt, gravel, or rock, the energy management module 80 may implement an energy reduction action of stopping rotation of the blade of the robotic vehicle 10 at operation 360. Each of these example operations is merely an example of a specific energy reduction action that could be implemented in response to a corresponding specific stimulus. However, other stimuli and responsive actions could be employed in other example embodiments.

Figure 6:
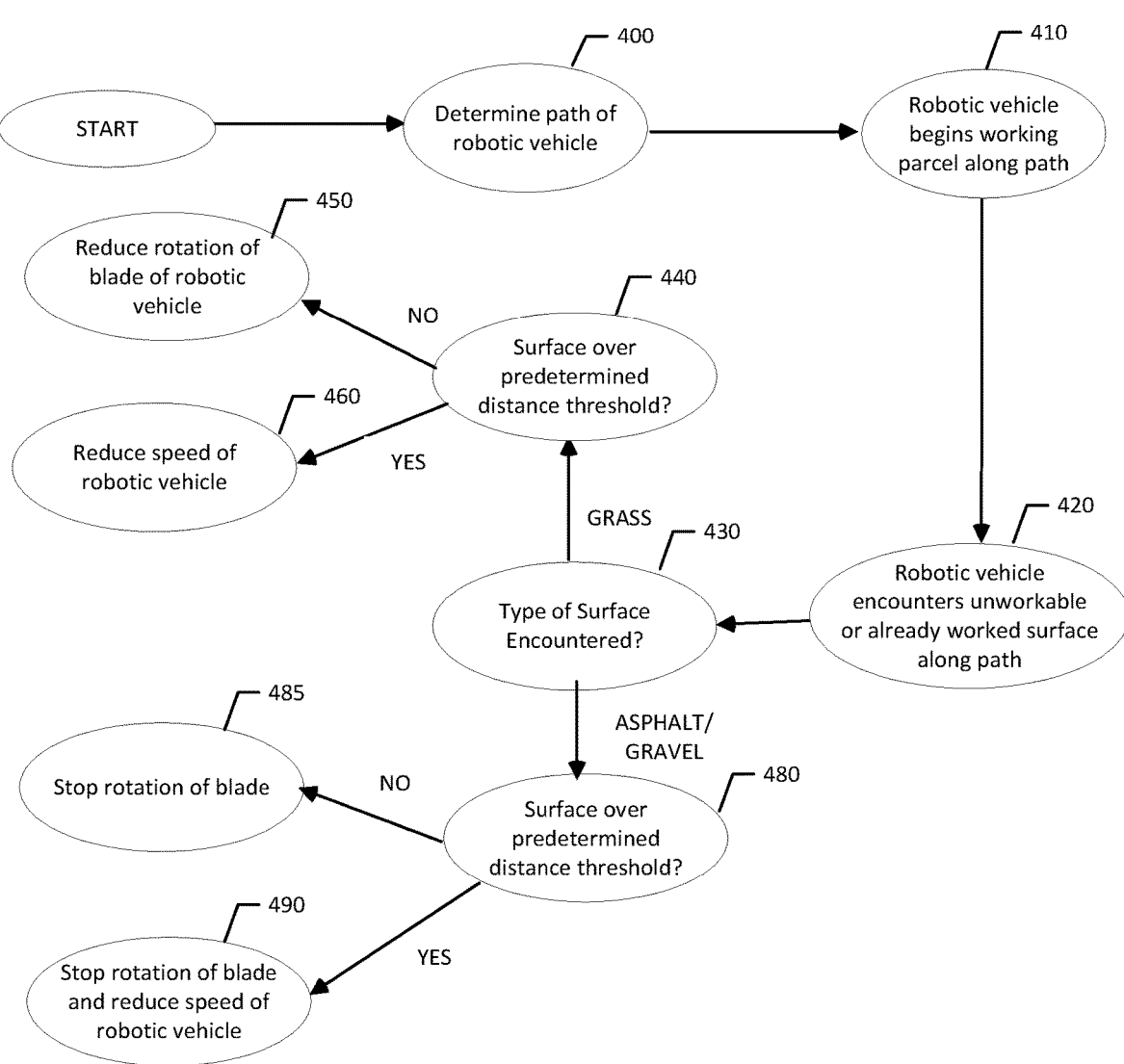
FIG. 6 illustrates a control flow diagram showing an energy reduction action that may be executed in accordance with a further example embodiment.

FIG. 6 illustrates a control flow diagram of one example of how the robotic vehicle 10 may be operated in relation to implementing an energy reduction action in accordance with a further example embodiment. As shown in FIG. 6, operation 400 may begin with the positioning module 60 and/or the mapping module 70 contributing to determining the path by which the robotic vehicle 10 is to work a parcel 20. At operation 410, the robotic vehicle 10 may begin working the parcel 20 along the determined path. While working parcel along the determined path, the robotic vehicle 10 may encounter an unworkable or already worked surface at operation 420. At operation 430, the energy management module 80 may determine the unworkable or already worked surface is grass, asphalt, or a gravel/rock surface. If the surface is grass, the energy management module 80 may then determine if the surface extends over a predetermined distance threshold (e.g., 10 meters) at operation 440. If the surface exceeds the predetermined distance threshold, the energy management module 80 may implement an energy reduction action of adjusting speed of the robotic vehicle 10 to an energy efficient movement speed at operation 460. If the surface does not exceed the predetermined distance threshold, the energy management module 80 may implement an energy reduction action of reducing the speed of rotation of a blade of the robotic vehicle 10 at operation 450. If the surface is asphalt, gravel, or rock, the energy management module 80 may then determine if the surface extends over a predetermined distance threshold (e.g., 10 meters) at operation 480. If the surface exceeds the predetermined distance threshold, the energy management module 80 may implement an energy reduction action of stopping rotation of the blade of the robotic vehicle 10 and reducing speed of the robotic vehicle 10 at operation 490. If the surface does not exceed the predetermined distance threshold, the energy management module 80 may implement an energy reduction action of stopping rotation of the blade of the robotic vehicle 10 at operation 485.

Figure 7:
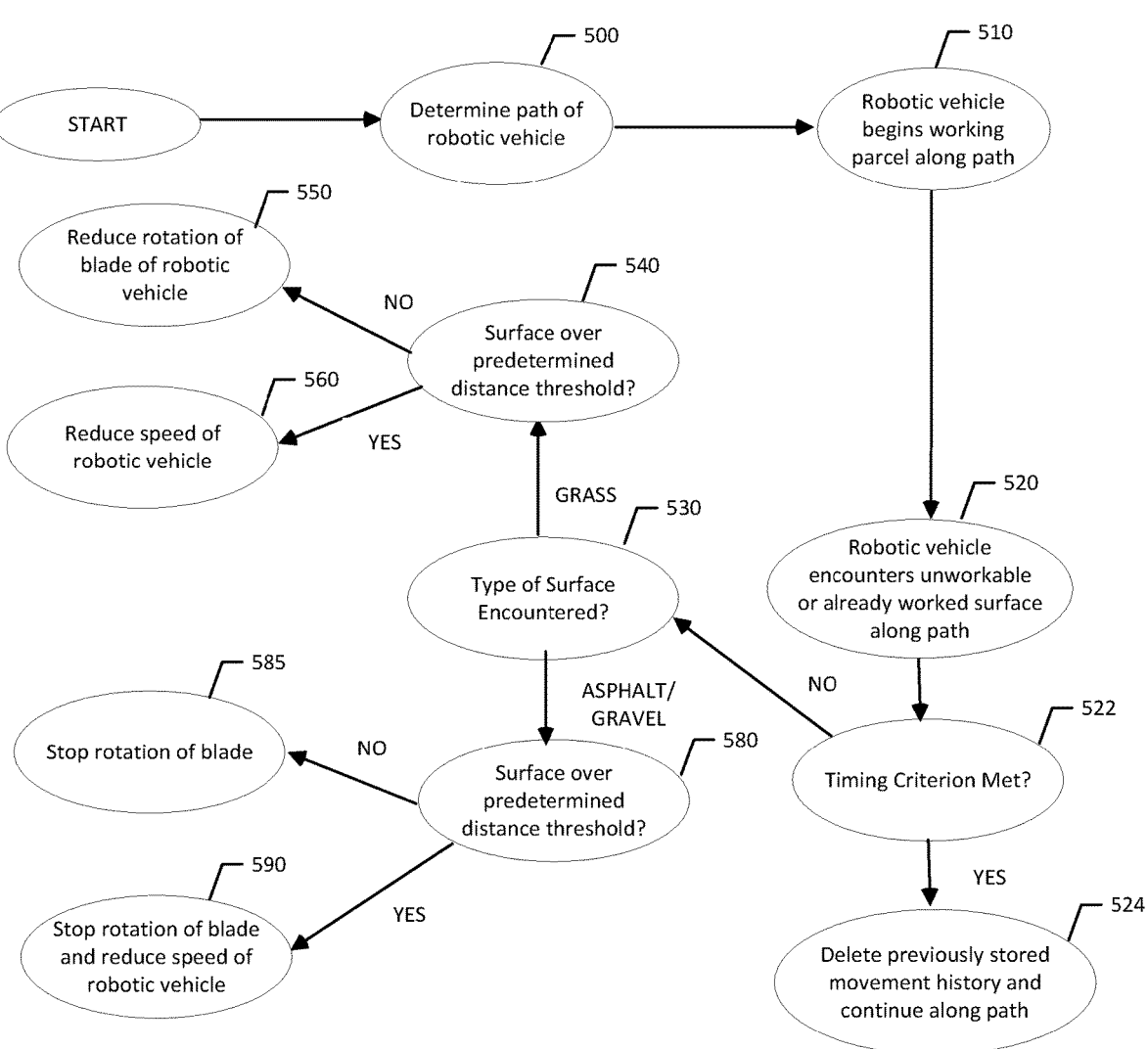
FIG. 7 illustrates a control flow diagram showing an energy reduction action that may be executed in accordance with an even further example embodiment.

FIG. 7 illustrates a control flow diagram of one example of how the robotic vehicle 10 may be operated in relation to implementing an energy reduction action in accordance with an even further example embodiment. As shown in FIG. 7, operation 500 may begin with the positioning module 60 and/or the mapping module 70 contributing to determining the path by which the robotic vehicle 10 is to work a parcel 20. At operation 510, the robotic vehicle 10 may begin working the parcel 20 along the determined path. While working the parcel 20 along the determined path, the robotic vehicle 10 may encounter an unworkable or already worked surface at operation 520. At operation 522, the energy management module 80 may determine if the movement history indicating that a surface has already worked exceeds a timing criterion. For example, the energy management module 80 may determine if the movement history is older than 8 hours or was taken on a different day. If so, at operation 524, the timing criterion would be exceeded and the energy management module 80 would delete the movement history and cause the robotic vehicle 10 to continue along the path. At operation 530, if the timing criterion was not exceeded, the energy management module 80 may determine the unworkable or already worked surface is grass, asphalt, or a gravel/rock surface. If the surface is grass, the energy management module 80 may then determine if the surface extends over a predetermined distance threshold (e.g., 10 meters) at operation 540. If the surface exceeds the predetermined distance threshold, the energy management module 80 may implement an energy reduction action of reducing speed of the robotic vehicle 10 at operation 560. If the surface does not exceed the predetermined distance threshold, the energy management module 80 may implement an energy reduction action of reducing rotation of a blade of the robotic vehicle 10 at operation 550. If the surface is asphalt, gravel, or rock, the energy management module 80 may then determine if the surface extends over a predetermined distance threshold (e.g., 10 meters) at operation 580. If the surface exceeds the predetermined distance threshold, the energy management module 80 may implement an energy reduction action of stopping rotation of the blade of the robotic vehicle 10 and reducing speed of the robotic vehicle 10 at operation 590. If the surface does not exceed the predetermined distance threshold, the energy management module 80 may implement an energy reduction action of stopping rotation of the blade of the robotic vehicle 10 at operation 585.

Of note, the processes of FIGS. 5-7 may incorporate all of position determining, boundary management, and energy management, which can be accomplished based on the inclusion of the sensor network 90 and the modules described above. As such, in some cases, the robotic vehicle 10 may generally operate in accordance with a control method that combines the modules described above to provide a functionally robust robotic vehicle 10. In this regard, methods according to example embodiments of the invention may include any or all of the operations shown in FIGS. 8 and 9.

Figure 8:
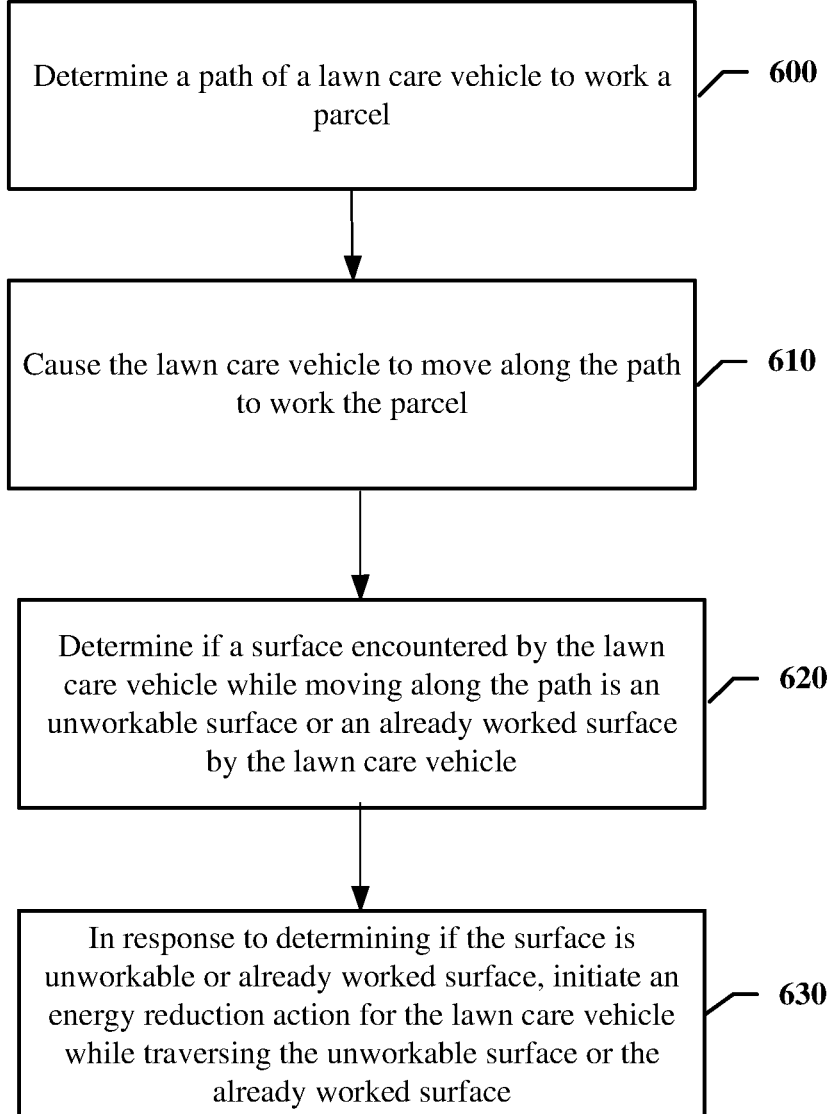
FIG. 8 illustrates a block diagram of a method of reducing energy expended by a lawn care vehicle in accordance with an example embodiment.

In an example embodiment, a method for reducing energy expended by a lawn care vehicle while working a parcel may be provided. As shown in FIG. 8, the method may include determining, via processing circuitry of the lawn care vehicle, a path for the lawn care vehicle to work the parcel at operation 600. The method may also include causing, via the processing circuitry, the lawn care vehicle to move along the path to work the parcel at operation 610. The method may even further include determining, via the processing circuitry of the lawn care vehicle, if a surface encountered by the lawn care vehicle while moving along the path is an unworkable surface or an already worked surface by the lawn care vehicle at operation 620. The method may also include, in response to determining if the surface is unworkable or already worked by the lawn care vehicle, initiating, via the processing circuitry, an energy reduction action for the lawn care vehicle while traversing the unworkable surface or the already worked surface at operation 630.

Figure 9:
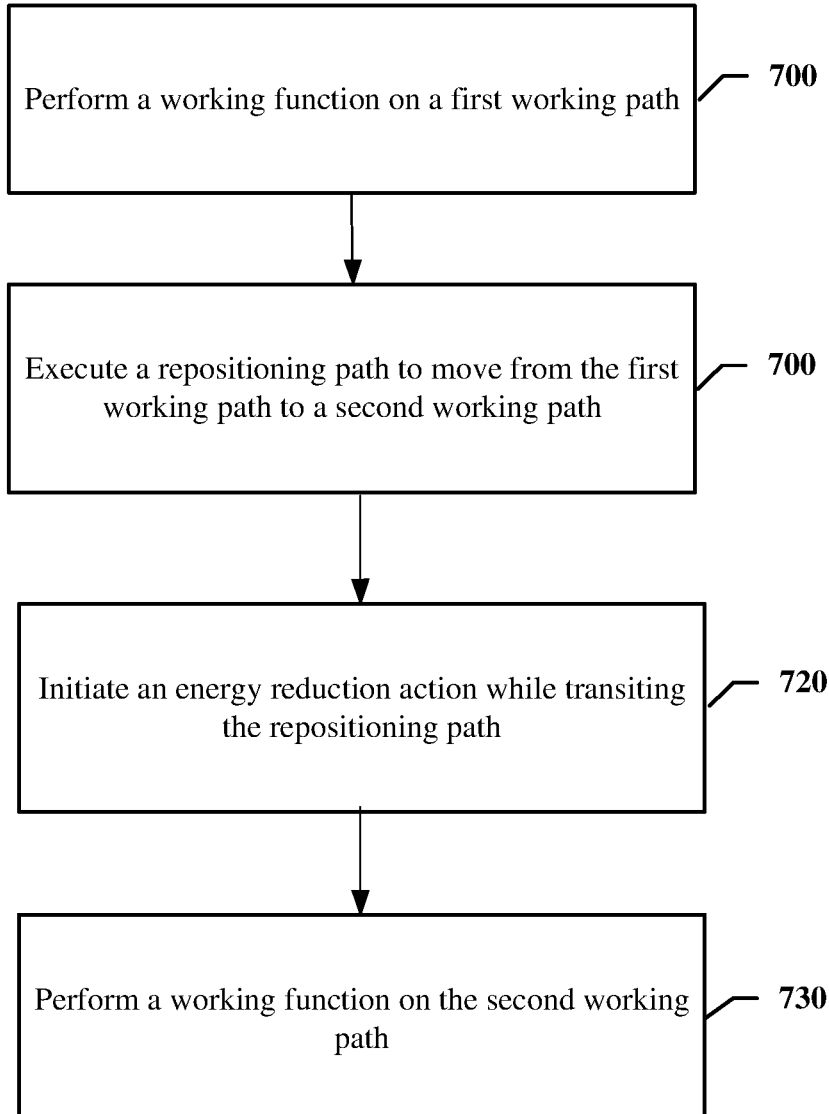
FIG. 9 illustrates a block diagram of a method of reducing energy expended by a lawn care vehicle in accordance with a further example embodiment.

In a further example embodiment, an additional method for reducing energy expended by a lawn care vehicle while working a parcel may be provided. As shown in FIG. 9, the method may include causing, via processing circuitry of the lawn care vehicle, the lawn care vehicle to perform a working function on a first working path on a parcel, at operation 700. The method may also include executing or detecting, via the processing circuitry, a repositioning path to cause the lawn care vehicle to move from the first working path to a second working path on which the lawn care vehicle is also configured to perform the working function at operation 710. The method may even further include initiating, via the processing circuitry, an energy reduction action for the lawn care vehicle while traversing the repositioning path at operation 720. Furthermore, the method may include causing, via the processing circuitry, the lawn care vehicle to perform the working function on the second working path at operation 730.

Accordingly, example embodiment described herein may provide a lawn care vehicle that includes a mobility assembly configured to provide mobility for the lawn care vehicle, and a working assembly configured to perform a working function on a first working path and a second working path on a parcel. The lawn care vehicle may further include processing circuitry configured to execute a repositioning path to cause the lawn care vehicle to move from the first working path to the second working path and initiate an energy reduction action for the lawn care vehicle while the lawn care vehicle transits the repositioning path In some embodiments, additional optional structures or features may be included or the structures/features described above may be modified or augmented. Each of the additional features, structures, modifications, or augmentations may be practiced in combination with the structures/features above or in combination with each other. Thus, some, all or none of the additional features, structures, modifications, or augmentations may be utilized in some embodiments. Some example additional optional features, structures, modifications, or augmentations are described below, and may include, for example, that the energy reduction action is initiated in response to the repositioning path being a surface already worked by the lawn care vehicle. Alternatively or additionally, the energy reduction action may include adjusting a speed of the working assembly of the lawn care vehicle. Alternatively or additionally, the adjustment of the speed of the working assembly may include reducing the speed of the working assembly. Alternatively or additionally, the energy reduction action is initiated in response to the repositioning path being an unworkable surface by the lawn care vehicle. Alternatively or additionally, the energy reduction action may include stopping or reducing rotation of the working assembly of the lawn care vehicle. Alternatively or additionally, the energy reduction action is initiated in response to the repositioning path being a surface already worked by the lawn care vehicle within a predefined time criterion. Alternatively or additionally, the predefined time criterion is a different battery charge of the lawn care vehicle. Alternatively or additionally, the predefined time criterion is a different working operation of the lawn care vehicle. Alternatively or additionally, the predefined time criterion is more than a predefined time period. Alternatively or additionally, the energy reduction action is initiated in response to the repositioning path being a greater distance than a predetermined distance threshold. Alternatively or additionally, the energy reduction action may include either adjusting a speed of the working assembly of the lawn care vehicle or adjusting a speed of the lawn care vehicle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A lawn care vehicle comprising:
 a wheel assembly configured to provide mobility for the lawn care vehicle;

a blade control system configured to perform a working function on a first working path and a second working path on a parcel; and processing circuitry configured to:

execute a repositioning path to cause the lawn care vehicle to move from the first working path to the second working path; and initiate an energy reduction action for the lawn care vehicle while the lawn care vehicle transits the repositioning path, wherein the energy reduction action is initiated in response to the repositioning path being a greater distance than a predetermined distance threshold.

2. The lawn care vehicle of claim 1, wherein the energy reduction action is initiated in response to the repositioning path being a surface already worked by the lawn care vehicle.

3. The lawn care vehicle of claim 2, wherein the energy reduction action comprises adjusting a speed of the blade control system of the lawn care vehicle.

4. The lawn care vehicle of claim 3, wherein the adjustment of the speed of the blade control system comprises reducing the speed of the blade control system.

5. The lawn care vehicle of claim 1, wherein the energy reduction action is initiated in response to the repositioning path being an unworkable surface by the lawn care vehicle.

6. The lawn care vehicle of claim 5, wherein the energy reduction action comprises stopping or reducing rotation of the blade control system of the lawn care vehicle.

7. The lawn care vehicle of claim 1, wherein the energy reduction action is initiated in response to the repositioning path being a surface already worked by the lawn care vehicle within a predefined time criterion.

8. The lawn care vehicle of claim 7, wherein the predefined time criterion is a different battery charge of the lawn care vehicle.

9. The lawn care vehicle of claim 8, wherein the predefined time criterion is more than a predefined time period.

10. The lawn care vehicle of claim 7, wherein the predefined time criterion is a different working operation of the lawn care vehicle.

11. The lawn care vehicle of claim 1, wherein the energy reduction action comprises either adjusting a speed of the blade control system of the lawn care vehicle or adjusting a speed of the lawn care vehicle.

12. A method of reducing energy expended by a lawn care vehicle while working a parcel, the method comprising:

causing, via processing circuitry of the lawn care vehicle, the lawn care vehicle to perform a working function using a blade control system on a first working path;

detecting a repositioning path, via a sensor network and the processing circuitry, to cause the lawn care vehicle to move from the first working path to a second working path;

initiating, via the processing circuitry, an energy reduction action while the lawn care vehicle transits the repositioning path; and causing, via the processing circuitry, the lawn care vehicle to perform a working function using the blade control system on the second working path, wherein the energy reduction action is initiated in response to the repositioning path being a greater distance than a predetermined distance threshold.

13. The method of claim 12, wherein the energy reduction action is initiated in response to the repositioning path being a surface already worked by the lawn care vehicle.

14. The method of claim 13, wherein the energy reduction action comprises adjusting a speed of the blade control system of the lawn care vehicle.

15. The method of claim 14, wherein the adjustment of the speed of the blade control system comprises reducing the speed of the blade control system.

16. The method of claim 12, wherein the energy reduction action is initiated in response to the repositioning path being an unworkable surface by the lawn care vehicle.

17. The method of claim 12, wherein the energy reduction action is initiated in response to the repositioning path being a surface already worked by the lawn care vehicle within a predefined time criterion.

18. The method of claim 12, wherein the energy reduction action comprises either adjusting a speed of the blade control system of the lawn care vehicle or adjusting a speed of the lawn care vehicle.

* * * * *